(12) United States Patent
Yuan et al.

(10) Patent No.: US 7,761,765 B2
(45) Date of Patent: Jul. 20, 2010

(54) AUTOMATED ROOT CAUSE IDENTIFICATION OF LOGIC CONTROLLER FAILURE

(75) Inventors: Chengyin Yuan, Troy, MI (US); Fangming Gu, Rochester Hills, MI (US); Stephan R. Biller, Birmingham, MI (US); Richard C. Immers, Rochester Hills, MI (US); Jerome O. Schroeder, Romeo, MI (US); Roland J. Menassa, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 422 days.

(21) Appl. No.: 11/829,321

(22) Filed: Jul. 27, 2007

(65) Prior Publication Data

US 2009/0031181 A1      Jan. 29, 2009

(51) Int. Cl.
*G06F 11/00*      (2006.01)
(52) U.S. Cl. .................................................... 714/741
(58) Field of Classification Search .................. 714/741
See application file for complete search history.

(56) References Cited

U.S. PATENT DOCUMENTS

| | | | | |
|---|---|---|---|---|
| 5,517,637 A | * | 5/1996 | Bruce et al. | 703/15 |
| 5,640,403 A | * | 6/1997 | Ishiyama et al. | 714/737 |
| 6,185,707 B1 | * | 2/2001 | Smith et al. | 714/724 |
| 6,536,007 B1 | * | 3/2003 | Venkataraman | 714/724 |
| 7,089,474 B2 | * | 8/2006 | Burdine et al. | 714/738 |

OTHER PUBLICATIONS

Bani Younis, et al., Visualization of PLC Programs using XML; Proceedings of the American Control Conference (ACC2004), Boston, USA, pp. 3082-3087, Jun. 2004.
Bani Younis, et al., A Formal Method Based Re-Implementation Concept for PLC Programs and its Application; Proceedings of the 11th IEEE International Conference on Emerging Technologies and Factory Automation (ETFA 2006), Prague, Czech Republic, pp. 1340-1347, Sep. 2006.
Georg Frey, et al., Formal methods in PLC programming; Proceedings of the IEEE Conference on Systems Man and Cybernetics SMC 2000, Nashville, Oct. 8-11, 2000, pp. 2431-2436.
I. Moon, Modeling Programmable Logic Controllers for Logic Verification, IEEE Control Systems, Apr. 1994, pp. 53-59.

(Continued)

*Primary Examiner*—James C Kerveros
(74) *Attorney, Agent, or Firm*—Cantor Colburn LLP

(57) ABSTRACT

A method, system, and computer program product for automated root cause identification of a failure of a logic controller have been provided. The method includes receiving logic controller failure information, receiving a logic model of logic code for the logic controller, and mapping the logic controller failure information to the logic model to identify a logic failure model state. The method further includes determining a potential trigger of the failure of the logic controller as a root cause via tracing through at least one path in the logic model to reach the logic failure model state. The method also includes identifying the root cause in the logic code via mapping the root cause from the logic model to the logic code, and outputting the logic code with the identified root cause of the failure of the logic controller.

20 Claims, 4 Drawing Sheets

OTHER PUBLICATIONS

Q. Malik, Formal Verification Applied to Sequential Function Charts, Control and Automation Laboratory Department of Signals and Systems, Chalmers University of Technology, Goteborg, Sweden, Jan. 2004, 53 pages.

N. Bauer, et al., Verification of PLC Programs given as Sequential Function Charts, Lecture Notes in Computer Science 3147, Springer-Verlag, Sep. 2004, 24 pages.

* cited by examiner

```
⎧ S130_OpenPinClamps1
│     RC:   "#$N"
│           "#$T<ver 6.100>$N"
│           "#";
│     N:    OTE(RungComment);
│     N:    XIC(C05.PX1)XIO(C05.PX2)XIO(C06.PX2)XIC(C07.PX1);
200 ⎨ N:    XIC(LA21OR01PrtChkClr.Comp)XIC(MainCycle.ProcComp);
│     N:    OTE(PinClamps1.Open.Clear);
│     N:    XIC(Cell.Safety.MasterOn)XIC(Cell.Safety.ToolOutputs);
│     N:    OTE(PinClamps1.Open.Cmd)XIO(PinClamps1.Close.Cmd);
│     N:    OTE(PinClamps1.Open.Out)OTE(PM1.O.V2512);
│     N:    XIC(PinClamps1.Open.Out),XIC(PinClamps1.Open.Comp);
│     N:    XIC(PinClamps1.Open.Mem),XIC(PinClamps1.Open.TMR.DN);
⎩     N:    OTU(SL.NotVisible);
```

*Fig. 2*

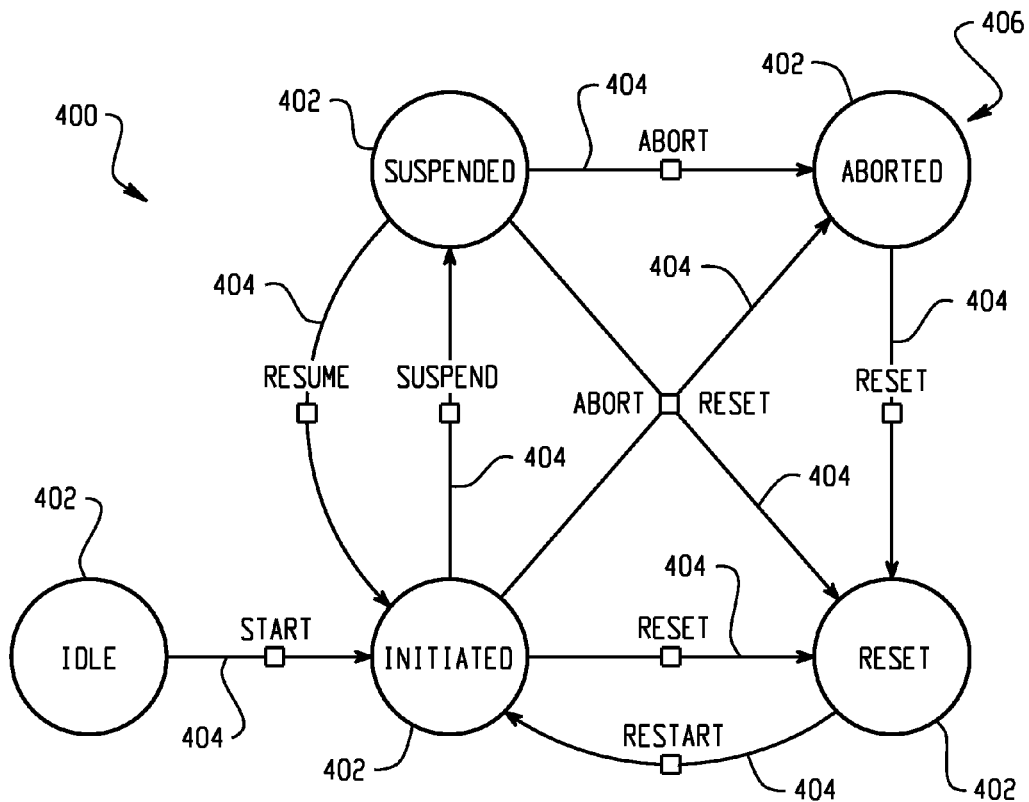

*Fig. 4*

```xml
<?xml version="1.0" encoding="ISO-8859-1"?>
<SCT_FSM>
<NAME>Trace</NAME>
<SCT_STATES>
    <SCTSTATE>
        <NAME>Idle</NAME><STATE_TYPE>2</STATE_TYPE>
    </SCTSTATE>
    <SCTSTATE>
        <NAME>Initiated</NAME><STATE_TYPE>2</STATE_TYPE>
    </SCTSTATE>
    <SCTSTATE>
        <NAME>Reset</NAME><STATE_TYPE>2</STATE_TYPE>
    </SCTSTATE>
    <SCTSTATE>
        <NAME>Suspended</NAME><STATE_TYPE>2</STATE_TYPE>
    </SCTSTATE>
    <SCTSTATE>
        <NAME>Aborted</NAME><STATE_TYPE>2</STATE_TYPE>
    </SCTSTATE>
</SCT_STATES>
<SCT_EVENTS>
    <SCTEVENT>
        <NAME>Start</NAME><STARTSTATE>Idle</STARTSTATE><ENDSTATE>Initiated</ENDSTATE>
    </SCTEVENT>
    <SCTEVENT>
        <NAME>Reset</NAME><STARTSTATE>Initiated</STARTSTATE><ENDSTATE>Reset</ENDSTATE>
    </SCTEVENT>
    <SCTEVENT>
        <NAME>Restart</NAME><STARTSTATE>Reset</STARTSTATE><ENDSTATE>Initiated</ENDSTATE>
    </SCTEVENT>
    <SCTEVENT>
        <NAME>Suspend</NAME><STARTSTATE>Initiated</STARTSTATE><ENDSTATE>Suspended</ENDSTATE>
    </SCTEVENT>
    <SCTEVENT>
        <NAME>Resume</NAME><STARTSTATE>Suspended</STARTSTATE><ENDSTATE>Initiated</ENDSTATE>
    </SCTEVENT>
    <SCTEVENT>
        <NAME>Abort</NAME><STARTSTATE>Initiated</STARTSTATE><ENDSTATE>Aborted</ENDSTATE>
    </SCTEVENT>
```

Fig. 3

```
⎧ S130_OpenPinClamps1
⎪     RC:   "#$N"
⎪           "#$T<ver 6.100>$N"
⎪           "#";
⎪     N:    OTE(RungComment);
⎪     N:    XIC(C05.PX1)XIO(C05.PX2)XIO(C06.PX2)XIC(C07.PX1);
⎪     N:    XIC(LA210R01PrtChkClr.Comp)XIC(MainCycle.ProcComp);
200 ⎨     ┌─────────────────────────────────────────────────────────┐
⎪     N: │ OTE(PinClamps1.Open.Clear);                              │
⎪     N: │ XIC(Cell.Safety.MasterOn)XIC(Cell.Safety.ToolOutputs);   │ ← 502
⎪     N: │ OTE(PinClamps1.Open.Cmd)XIO(PinClamps1.Close.Cmd);       │
⎪     N: │ OTE(PinClamps1.Open.Out)OTE(PM1.O.V2512);                │
⎪     └─────────────────────────────────────────────────────────┘
⎪     N:    XIC(PinClamps1.Open.Out), XIC(PinClamps1.Open.Comp);
⎪     N:    XIC(PinClamps1.Open.Mem), XIC(PinClamps1.Open.TMR.DN);
⎩     N:    OTU(SL.NotVisible);
```

Fig. 5

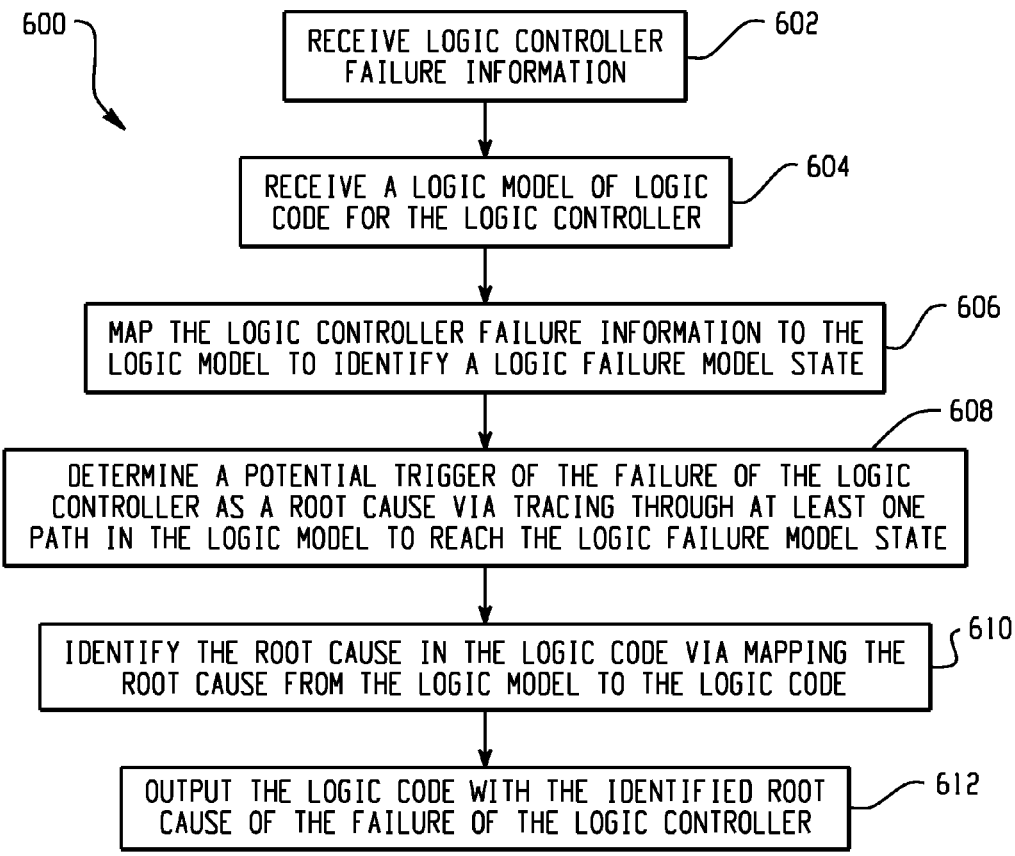

Fig. 6

AUTOMATED ROOT CAUSE IDENTIFICATION OF LOGIC CONTROLLER FAILURE

BACKGROUND OF THE INVENTION

The present disclosure relates to logic controllers and more particularly to automated root cause identification of logic controller failure.

In many manufacturing environments, logic controllers, such as programmable logic controllers (PLCs), are used to automate processes. Logic controllers may also be used in a wide variety of non-manufacturing environments that rely upon automated controls, for example, warehouses, water supply systems, electric power generation, transmission and distribution, gas and oil pipelines, and other distributed processes. Regardless of the particular application, enterprises that rely on logic controllers for process automation typically prefer to minimize downtime associated with a failure of a logic controller, as productivity may halt while the failure is being identified and remedied. The collective cost of downtime can be substantial in an automated environment that employs numerous logic controllers. For example, in an automotive assembly plant, individual logic controllers may control each robot cell on an assembly line, with dozens to hundreds of logic controllers used throughout the assembly line. A single failure may halt the entire assembly line, leading to lost production capacity.

Logic controllers execute logic programs that can contain thousands of lines of code (e.g., rungs of ladder logic), addressing thousands of input/output points or memory locations. Due to system complexity and incompleteness of test data, it is very difficult and time consuming to fully validate logic code to ensure that it is 100% correct during code development, and thus some logic errors are not found until deployment in the automated environment. When a logic failure occurs in the automated environment, it is desirable to quickly identify the root cause of the failure and correct the logic code to minimize downtime and safety risks. A typical approach taken when a logic failure occurs is that a control engineer manually scans the logic code line-by-line (often in a paper format) to attempt to identify the root cause. Depending upon the control engineer's experience level and the volume of logic code involved, this approach can take several weeks, resulting in high costs associated with lost production time and capacity. Moreover, when a safety related failure occurs involving logic controllers, the logic code in all logic controllers potentially involved in the failure may require detailed scrutinizing, placing a substantial burden upon the control engineers.

Accordingly, there is a need in the art for automated root cause identification of logic controller failure to reduce downtime and increase efficiency associated with failure resolution.

BRIEF DESCRIPTION OF THE INVENTION

An embodiment of the invention includes a method for automated root cause identification of a failure of a logic controller. The method includes receiving logic controller failure information, receiving a logic model of logic code for the logic controller, and mapping the logic controller failure information to the logic model to identify a logic failure model state. The method further includes determining a potential trigger of the failure of the logic controller as a root cause via tracing through at least one path in the logic model to reach the logic failure model state. The method also includes identifying the root cause in the logic code via mapping the root cause from the logic model to the logic code, and outputting the logic code with the identified root cause of the failure of the logic controller.

Another embodiment of the invention includes a system for automated root cause identification of a failure of a logic controller. The system includes a host system, a data storage device in communication with the host system, and a model analyzer executing on the host system. The data storage device holds a logic model of logic code for the logic controller. The model analyzer includes computer instructions for receiving logic controller failure information, receiving the logic model, and mapping the logic controller failure information to the logic model to identify a logic failure model state. The model analyzer further includes computer instructions for determining a potential trigger of the failure of the logic controller as a root cause via tracing through at least one path in the logic model to reach the logic failure model state. The model analyzer also includes computer instructions for identifying the root cause in the logic code via mapping the root cause from the logic model to the logic code, and outputting the logic code with the identified root cause of the failure of the logic controller.

A further embodiment of the invention includes a computer program product for automated root cause identification of a failure of a logic controller. The computer program product includes a storage medium readable by a processing circuit and storing instructions for execution by the processing circuit for implementing a method. The method includes receiving logic controller failure information, receiving a logic model of logic code for the logic controller, and mapping the logic controller failure information to the logic model to identify a logic failure model state. The method further includes determining a potential trigger of the failure of the logic controller as a root cause via tracing through at least one path in the logic model to reach the logic failure model state. The method also includes identifying the root cause in the logic code via mapping the root cause from the logic model to the logic code, and outputting the logic code with the identified root cause of the failure of the logic controller.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring to the exemplary drawings wherein like elements are numbered alike in the accompanying Figures:

FIG. 2 depicts an exemplary logic code segment that may be utilized by exemplary embodiments;

FIG. 3 depicts an exemplary segment of a logic model in a neutral format that may be created via exemplary embodiments;

FIG. 4 depicts an exemplary graphical representation of a logic model that may be created via exemplary embodiments;

FIG. 5 depicts an exemplary logic code segment with an identified root cause of a failure of a logic controller that may be identified via exemplary embodiments; and FIG. 6 depicts an exemplary process flow that may be implemented by exemplary embodiments for automated root cause identification of a logic controller failure.

DETAILED DESCRIPTION OF THE INVENTION

Figure 1:
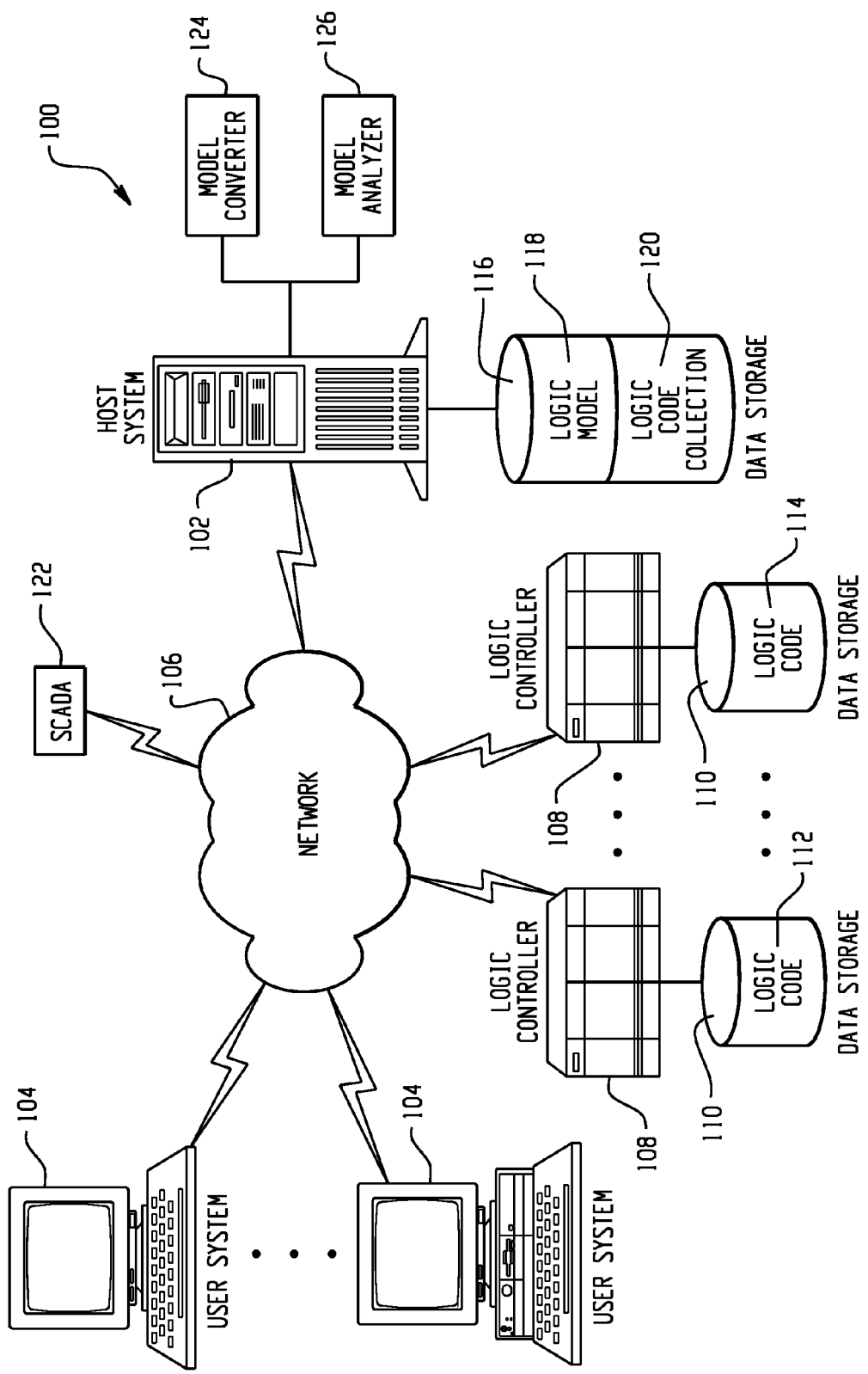
FIG. 1 depicts an exemplary system for automated root cause identification of a logic controller failure that may be utilized by exemplary embodiments.

Exemplary embodiments, as shown and described by the various figures and the accompanying text, provide methods, systems and computer program products for automated root cause identification of a logic controller failure. A logic controller, such as a programmable logic controller (PLC), may be used to automate processes in a wide variety of environments, including manufacturing, warehouse management, and control and distribution of numerous resources. The logic controller can support numerous inputs and outputs (I/Os), such as limit switches, temperatures, pressures, positions, machine vision, electric motors, pneumatic or hydraulic cylinders or diaphragms, magnetic relays, solenoids, and other digital and analog I/O. The I/O may be integrated with the logic controller, or the logic controller may have external I/O modules that can be coupled together through a computer network. In exemplary embodiments, the logic controller supports a variety of functions through logic code programming, for example, sequential relay control, motion control, process control, distributed system control, and networking. Due to the configurability of logic controllers, numerous customized programs are written for logic controllers to perform disparate tasks. Moreover, logic code can be modified in the field (i.e., target automated environment), which can make debugging of logic controller failures (e.g., logic code error in a logic controller) extremely difficult. A process for automated root cause identification of a logic controller failure is described in greater detail herein.

In exemplary embodiments, logic code for one or more logic controllers is converted into a neutral format logic model via a model converter. A logic model may include any structured modeling format known in the art, such as a finite automata model, a Petri Net model, a unified modeling language (UML) model, or other state transition models. The logic model may be stored in a neutral format, such as extensible markup language (XML), XML metadata interchange (XMI), or other formats that can be interpreted by a wide variety of applications and platforms. In exemplary embodiments, the logic model is displayed in a graphical format for ease of interpretation by an end user. When a logic controller failure occurs, associated information surrounding the failure is captured and input to a model analyzer. In exemplary embodiments, the model analyzer traces through the logic model, identifying potential triggers of the failure. The model analyzer identifies portions of logic code associated with the identified potential triggers of the failure as a root cause of the failure, and notifies an end user of the identified portions of the logic code. There may be multiple root causes identified for any given failure, with one or more portions of logic code identified for each root cause. An end user, such as a control engineer, can then focus his or her analysis on the identified portions of the logic code, thus reducing the debugging and analysis time required by the control engineer, avoiding manual analysis of potentially thousands of lines of logic code.

Turning now to the drawings, it will be seen that in FIG. 1 there is a block diagram of a system 100 upon which automated root cause identification of a logic controller failure is implemented in exemplary embodiments. The system 100 of FIG. 1 includes a host system 102 in communication with user systems 104 over a network 106. Logic controllers 108 are also connected to the network 106, which may be accessible by the host system 102 and/or any number of user systems 104. In an exemplary embodiment, the host system 102 is a high-speed processing device (e.g., a mainframe computer) including at least one processing circuit (e.g., a CPU) capable of reading and executing instructions, and handling large volumes of processing requests from user systems 104. The host system 102 may function as an application server, a database management server, and a web server. User systems 104 may comprise desktop or general-purpose computer devices that generate data and processing requests. While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein.

The network 106 may be any type of communications network known in the art. For example, the network 106 may be an intranet, extranet, or an internetwork, such as the Internet, or a combination thereof. The network 106 can be a wireless or wired network.

The logic controllers 108 may be any type of logic controller device capable of executing logic code and performing logic functions, e.g. a PLC, a microcontroller, or the like. In exemplary embodiments, the logic controller 108 accesses a data storage device 110 to read executable logic code. The data storage device 110 may be any type of storage element known in the art such as a battery-backed or read-only memory (e.g., flash memory, NOVRAM, EEPROM, PROM, hard disk device, optical disk device, and the like), and may be either internal or external to the logic controller 108. The logic controller 108 may support a wide variety of programming languages, for example, ladder logic, function block diagrams, structured text, instruction lists, sequential function charts, and various other programming languages (e.g., international standard IEC 61131-3 compatible languages). While only two logic controllers 108 are depicted in the system 100 of FIG. 1, it will be understood that any number of logic controllers 108 may be implemented within the scope of the invention. While each logic controller 108 is depicted as coupled to a single data storage device 110, multiple logic controllers 108 may share one or more data storage devices 110. Moreover, although multiple logic controllers 108 can share or have common logic code, each logic controller 108 can have customized logic code for specific purposes, such as logic code 112 and 114. For example, the logic code 112 may be specifically designed for operating a welding robot, while the logic code 114 may be specifically designed for controlling an automated conveyor system.

In exemplary embodiments, the host system 102 accesses and stores information to a data storage device 116. The data storage device 116 refers to any type of storage and may comprise a secondary storage element, e.g., hard disk drive, tape, or a storage subsystem that is external to the host system 102. In alternate exemplary embodiments, the data storage device 116 is internal to the host system 102. It will be understood that the data storage device 116 shown in FIG. 1 is provided for purposes of simplification and ease of explanation and is not to be construed as limiting in scope. To the contrary, there may be any number data storage devices 116 accessible by the host system 102. The data storage device 116 may hold a logic model 118 and a logic code collection 120. In exemplary embodiments, the logic model 118 is a neutral format model of logic code for one or more logic controllers 108, such as the logic code 112 and 114.

The logic model 118 may model logic code in any structured modeling format known in the art, such as a finite automata model, a Petri Net model, a UML model, or state transition models. In exemplary embodiments, the logic model 118 is stored in neutral (non-device specific) format, such as XML, that can be interpreted on by a wide variety of computer systems, such as the user systems 104.

The logic code collection 120 may represent one or more copies of logic code copied from one or more logic controllers, such as the logic code 112 and 114 associated with the logic controllers 108. The logic code collection 120 can be a temporary storage area for use in translating between logic code and the logic model 120. In alternate exemplary embodiments, the logic code collection 120 is a library of one or more versions of logic code deployed in the system 100, e.g., development and/or configuration management logic code library.

A supervisory control and data acquisition system (SCADA) 122 interfaces with the logic controllers 108 through the network 106, performing supervisory control and data acquisition functions. The SCADA 122 may include input/output interfaces, network interfaces, computing elements, storage elements, and software. In exemplary embodiments, the SCADA 122 enables an end user, such as an operator or engineer using the user systems 104, to remotely monitor the performance of the logic controllers 108. The SCADA 122 monitors the failure status of the logic controllers 108, providing automated failure detection, or enabling manual user input of failure related information. The SCADA 122 supports logic code upload and download capabilities, thereby allowing logic code, such as the logic code 112 and 114, to be read or updated through the network 106. For example, the SCADA 122 can read the logic code 112 via the network 106 and write a copy of the logic code 112 to the logic code collection 120. While the system 100 of FIG. 1 is depicted with the SCADA 122, it will be understood that the SCADA 122 can be omitted or implemented as a software application executable upon the host system 102 in alternate exemplary embodiments.

In exemplary embodiments, the host system 102 executes various applications such as a model converter 124 and a model analyzer 126. The model converter 124 and the model analyzer 126 may be managed and configured as separate applications or may be combined into a single comprehensive application. Any module, sub-component, or portion of the model converter 124 and the model analyzer 126 may be executed or stored on any combination of the user systems 104, e.g., a distributed application architecture. Other applications, e.g., business applications, a web server, etc., may also be implemented by the host system 102 as dictated by the needs of the enterprise of the host system 102.

In exemplary embodiments, the model converter 124 converts logic code into the logic model 118. The model converter 124 may read logic code directly from the logic controller 108, e.g., the logic code 112, or the model converter 124 may read logic code from the logic code collection 120. Since logic code may be updated in the field, i.e., local to the logic controller 108, it may be preferable to perform model conversion on logic code uploaded from the logic controller 108 rather than use a configuration controlled version of the logic code as previously deployed to the field. The model converter 124 may parse logic code to identify model elements specific to the modeling technique employed. A variety of reverse engineering techniques can be used to convert logic code into the logic model 118. For example, a model can be I/O-based, where I/O combinations are translated to model states, or the model can be process-based, defining states and transition criteria. Through identifying programming language specific constructs in the logic code (looping, I/O manipulation, decision statements, branching instructions, and the like), the logic code can be converted to alternate structures through translating the programming language specific constructs from a native logic code format into the logic model 118 in a neutral format (e.g., a state transition model in XML). Exemplary conversion techniques known in the art have been disclosed, for example, in articles written by M. YOUNIS et al. entitled *Visualization of PLC Programs Using XML*, Proceedings of the American Control Conference (ACC2004), June 2004, pp. 3082-3087, Boston, USA; and *A Formal Method Based Re-Implementation Concept for PLC Programs and its Application*, Proceedings of the 11th IEEE International Conference on Emerging Technologies and Factory Automation (ETFA 2006), September 2006, pp. 1340-1347, Prague, Czech Republic. The model converter 124 supports any structured modeling format known in the art, such as a finite automata model, a Petri Net model, a UML model, or state transition models.

Turning now to FIG. 2, an exemplary logic code segment 200 will now be described in accordance with exemplary embodiments. The exemplary logic code segment 200 represents a small portion (i.e., several lines) of logic code that may be executed by the logic controller 108 of FIG. 1. For example, the exemplary logic code segment 200 may represent a small portion of the logic code 112, 114, or the logic code collection 120 of FIG. 1. The model converter 124 of FIG. 1 may perform a model conversion on the logic code segment 200 of FIG. 2 to generate the logic model 118 of FIG. 1, as previously described. In exemplary embodiments, the model converter 124 of FIG. 1 converts logic code into a neutral format logic model, an exemplary segment of which is depicted in FIG. 3 as a neutral format logic model 300. While only a portion of the neutral format logic model is depicted in FIG. 3, it will be apparent that the neutral format logic model 300 is an XML file with model elements grouped, for example, as model states 302 and events 304. The neutral format logic model 300 may contain other model elements not depicted in FIG. 3, such as event triggers, transition criteria, and 110 definitions.

Returning now to the FIG. 1, when a logic controller failure occurs in one or more logic controllers 108, the model analyzer 124 can be used to analyze a modeled version of the associated logic code (e.g., logic code 112 and/or 114 modeled as the logic model 118) to determine the portion of the logic code that most likely contributed to the logic controller failure. The logic controller failure may be observed as I/O data (e.g., sensors, switches, actuators, timers, and so forth) in a combination that results in tripping an alarm or other threshold criteria, where the I/O data combination is captured by the SCADA 122 as logic controller failure information. In exemplary embodiments, the model analyzer 126 reads the logic model 118, maps the logic controller failure information to a corresponding state in the logic model 118, determines a potential trigger of the failure, and maps the potential trigger back to the logic code upon which the logic model 118 is based. The model analyzer 126 may receive logic controller failure information from the SCADA 122 or from other input sources (e.g., manually input information). Depending upon the modeling format used to create the logic model 118, different techniques can be employed to map the logic controller failure information to the corresponding state in the logic model 118. For example, if the logic controller failure information is captured as I/O data and the logic model 118 is an I/O-based model, then the model analyzer 126 can identify a model state that aligns with the I/O combination in the logic controller failure information, i.e., the logic failure model state. In alternate exemplary embodiments, a control engineer analyzes the logic controller failure information and determines the model state of the logic model 118 that most closely aligns with the logic controller failure information and configures the model analyzer 126 to perform analysis for the logic failure model state. In exemplary embodiments, a control engineer interfaces with the model analyzer 126 via the user system 104.

A potential trigger of the failure of the logic controller 108 may be determined as a root cause by stepping backwards through the logic model 118 to determine probable conditions and/or events that resulted in the logic failure. In alternate exemplary embodiments, multiple iterations of the logic model 118 are executed, following different paths through model states until the logic failure model state is reached. Depending upon the complexity of the logic model 118, a variable number of paths through the logic model 118 can be analyzed to increase confidence that the root cause of the logic controller failure is properly identified. The root cause may be further refined through analyzing paths through the logic model 118 that result in reaching the logic failure model state, and identifying common events or conditions occurring between paths that result in reaching the logic failure model state. There may be multiple root causes identified for any given failure.

Once a root cause of the logic controller failure has been determined, the model analyzer 126 identifies the portion of logic model 118 associated with the root cause of the logic controller failure. In exemplary embodiments, the model analyzer 126 maps the identified root cause portion of the logic model 118 back to the logic code used to generate the logic model 118 to identify the portion of the logic code most likely contributing to the logic controller failure. The mapping between logic model 118 and logic code may be performed in whole or in part via the model converter 124. The logic code with the identified root cause may be transmitted to the user system 104, where a user, such as a control engineer, can focus his or her analysis for debugging and code modification at the identifying portion of the logic code. For example, if the logic code collection 120 holds the logic code used to generate the logic model 118, the model analyzer 126 identifies a portion of the logic code collection 120 as the root cause contributor to the logic controller failure through highlighting, boldface, italics, underlining, encapsulating in a geometric shape (e.g., a box), altering the text color, appending a graphical symbol, or using any other technique capable of distinguishing the root cause from the remainder of the logic code. In alternate exemplary embodiments, the root cause is identified as one or more line numbers in the logic code. There may be multiple root causes identified for any given failure, with one or more portions of logic code identified for each root cause. Once the control engineer receives the root cause identification information, the control engineer can update the logic code and deploy the updated logic code back to the field without manually stepping through each line of logic code, and thus returning the automated environment to a normal operating state with minimal downtime.

A graphical representation of a logic model 400 depicted in FIG. 4 may be displayed by the user systems 104 of FIG. 1. In exemplary embodiments, the graphical representation of the logic model 400 assists a user, such as a control engineer, in visualizing the logic model 400. The logic model 400 may include any number of model elements, such as model states 402 and transition criteria 404. The logic model 400 depicts a graphical view of an exemplary logic model 118 of FIG. 1. A control engineer can use the graphical representation of the logic model 400 to identify a logic failure model state 406, with or without the assistance of the model analyzer 126 of FIG. 1. For example, when executing logic code that is modeled by the logic model 400, the logic controller 108 of FIG. 1 may have failed while an "abort" operation was attempted, thus resulting in identifying the "aborted" model state 402 as the logic failure model state 406. Once the logic failure model state 406 has been identified, the model analyzer 126 of FIG. 1 can determine the root cause as previously described. For example, the model analyzer 126 of FIG. 1 may identify the transition criteria 404 labeled as "abort" in FIG. 4 as the root cause. Alternatively, the model analyzer 126 may trace multiple paths to the logic failure model state 406, discovering that only one path places the I/O of the logic controller 108 in a configuration consistent with the failure. For example, the failure could occur when transitioning from "suspended" model state 402 to "aborted" model state 402, while no failure occurs when transitioning from "initiated" model state 402 to "aborted" model state 402. The root cause can be identified in the logic code through mapping the root cause from the logic model 400 to logic code, as depicted in FIG. 5, where the logic code segment 200 of FIG. 5 (and as previously depicted in FIG. 2) illustrates an identified root cause 502.

Turning now to FIG. 6, a process 600 for automated root cause identification of a failure of the logic controller 108 will now be described in accordance with exemplary embodiments in reference to the system 100 of FIG. 1. At block 602, the model analyzer 126 receives logic controller failure information. The logic controller failure information may be acquired by the SCADA 122 and/or input by a user of the user systems 104.

At block 604, the model analyzer 126 receives the logic model 118 of logic code (e.g., logic code 112, 114, or from the logic code collection 120) for the logic controller 108. The model converter 124 may generate the logic model 118 via converting the logic code into the logic model 118. In exemplary embodiments, the logic model 118 is at least one of a Petri Net model, a finite automata model, and a unified modeling language (UML) model. The logic model 118 may be stored in a neutral XML-compatible format on the data storage device 116. At block 606, the model analyzer 126 maps the logic controller failure information to the logic model 118 to identify a logic failure model state.

At block 608, the model analyzer 126 determines a potential trigger of the failure of the logic controller 108 as a root cause via tracing through at least one path in the logic model 118 to reach the logic failure model state. The tracing may be performed from one of the mapped logic failure states through one or more paths of events, I/O settings, or other conditions. The model state and associated conditions occurring prior to reaching the logic failure model state may be identified as the root cause. In alternate exemplary embodiments, the model analyzer 126 starts analysis from the logic failure model state and traces backward to determine the root cause as a path that reaches the logic failure model state. Multiple model states, I/O settings, or other conditions may be identified as the root cause. Alternate techniques to establish the root cause of reaching the logic failure model state will be apparent to one skilled in the art within embodiments of the invention. Analysis to determine the root cause may be repeated to identify additional root causes.

At block 610, the model analyzer 126 identifies the root cause in the logic code (e.g., logic code 112, 114, or from the logic code collection 120) via mapping the root cause from the logic model 118 to the logic code. The model analyzer 126 may employ similar techniques employed by the model converter 124 in converting logic code into the logic model 118.

In alternate exemplary embodiments, the model converter 124 performs the mapping of the root cause from the logic model 118 to the logic code.

At block 612, the model analyzer 126 outputs the logic code with the identified root cause of the failure of the logic controller 108. The logic code with the identified root cause may be written to the logic code collection 120. In exemplary embodiments, the logic code with the identified root cause is returned to the user systems 104 and can be in a variety of formats, such as text, XML, HTML, portable document format (PDF), or similar formats. The root cause may be identified in the logic code using a variety of techniques, including: highlighting, boldface, italics, underlining, encapsulating in a geometric shape, altering text color, and appending a graphical symbol to portions of the logic code associated with the root cause. There may be multiple root causes identified for any given failure, with one or more portions of logic code identified for each root cause.

Technical effects and advantages of exemplary embodiments include automated root cause identification of a failure of a logic controller. Through automated root cause identification, a control engineer may focus on portions of logic code identified as a root cause of the failure, thus reducing total failure debugging time, as a full line-by-line review of the logic code may be avoided. Decreasing failure debugging time may equate to increased productivity and reduced costs associated with downtime in an environment employing the logic controller. Modeling logic code through a model conversion process can produce an accurate model of logic code deployed in the field (e.g., as running on a given logic controller), ensuring that any logic code modifications that occur in the field are included in the root cause analysis. Converting the logic code into a neutral format logic model may enable a variety of applications and third party products to display and interpret the logic model.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, universal serial bus (USB) drives, or any other computer readable storage medium, such as read-only memory (ROM), random access memory (RAM), and erasable-programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for automated root cause identification of a failure of logic code of a logic controller comprising:
   receiving logic controller failure information;
   receiving a logic model of the logic code of the logic controller;
   mapping the logic controller failure information to the logic model to identify a logic failure model state;
   determining at least one trigger of the failure of the logic code by tracing through at least one path in the logic model associated with the logic failure model state;
   identifying a root cause in the logic code, including mapping the root cause from the logic model to the logic code; and
   outputting the logic code with the identified root cause of the failure of the logic code.

2. The method of claim 1 further comprising:
   creating the logic model by converting the logic code into the logic model.

3. The method of claim 1 wherein the logic model is at least one of a Petri Net model, a finite automata model, and a unified modeling language (UML) model.

4. The method of claim 1 wherein the logic model is stored as a neutral format logic model.

5. The method of claim 4 wherein the neutral format logic model is an extensible markup language (XML)-compatible format.

6. The method of claim 1 wherein the logic controller is a programmable logic controller (PLC).

7. The method of claim 1 wherein identifying the root cause in the logic code further includes at least one of: highlighting, boldface, italics, underlining, encapsulating in a geometric shape, altering text color, and appending a graphical symbol to a portion of the logic code associated with the root cause.

8. The method of claim 1 wherein the logic controller failure information is acquired via one or more of a supervisory control and data acquisition system (SCADA) and observation from a human operator.

9. A system for automated root cause identification of a failure of logic code of a logic controller, comprising:
   a host system;
   a data storage device in communication with the host system, the data storage device holding a logic model of the logic code of the logic controller; and
   a model analyzer executing on the host system, the model analyzer including computer instructions for performing:
   receiving logic controller failure information;
   receiving the logic model;
   mapping the logic controller failure information to the logic model to identify a logic failure model state;

determining at least one trigger of the failure of the logic code by tracing through at least one path in the logic model associated with the logic failure model state;

identifying a root cause in the logic code, including mapping the at least one trigger from the logic model to the logic code; and outputting the logic code with the identified root cause of the failure of the logic code.

10. The system of claim 9 further comprising a model converter executing on the host system, the model converter including computer instructions for creating the logic model by converting the logic code into the logic model.

11. The system of claim 9, wherein the logic model is at least one of a Petri Net model, a finite automata model, and a unified modeling language (UML) model.

12. The system of claim 9, wherein the logic model is stored as a neutral format logic model.

13. The system of claim 9, wherein the neutral format logic model is an extensible markup language (XML)-compatible format.

14. The system of claim 9, wherein the logic controller is a programmable logic controller (PLC).

15. The system of claim 9, wherein identifying the root cause in the logic code further includes at least one of: highlighting, boldface, italics, underlining, encapsulating in a geometric shape, altering text color, and appending a graphical symbol to a portion of the logic code associated with the root cause.

16. The system of claim 9 further comprising a supervisory control and data acquisition system (SCADA), wherein the SCADA acquires the logic controller failure information.

17. A computer program product for automated root cause identification of a failure of logic code of a logic controller, the computer program product comprising:

a storage medium readable by a processing circuit and storing instructions for execution by the processing circuit for implementing a method, the method comprising:

receiving logic controller failure information;

receiving a logic model of the logic code of the logic controller;

mapping the logic controller failure information to the logic model to identify a logic failure model state;

determining at least one trigger of the failure of the logic code by tracing through at least one path in the logic model associated with the logic failure model state;

identifying a root cause in the logic code, including mapping the root cause from the logic model to the logic code; and outputting the logic code with the identified root cause of the failure of the logic code.

18. The computer program product of claim 17 wherein the logic model is at least one of Petri Net model, a finite automata model, and a unified modeling language (UML) model.

19. The computer program product of claim 17 wherein the logic model is stored as a neutral format logic model.

20. The computer program product of claim 17 wherein the logic controller is a programmable logic controller (PLC).

* * * * *